US012728629B2

(12) United States Patent
Haviv et al.

(10) Patent No.: US 12,728,629 B2
(45) Date of Patent: Sep. 8, 2026

(54) BIODEGRADABLE SHEETS

(71) Applicant: TIPA CORP. LTD, Hod HaSharon (IL)

(72) Inventors: Amit Haviv, Petach Tikva (IL); Neta Atias-Mekahel, Mishmar David (IL); Eli Lancry, Gan-Yavne (IL)

(73) Assignee: TIPA CORP. LTD, Hod Hasharon (IL)

( * ) Notice: Subject to any disclaimer, the term of this patent is extended or adjusted under 35 U.S.C. 154(b) by 217 days.

(21) Appl. No.: 18/687,309

(22) PCT Filed: Aug. 21, 2022

(86) PCT No.: PCT/IL2022/050910
§ 371 (c)(1),
(2) Date: Feb. 28, 2024

(87) PCT Pub. No.: WO2023/031908
PCT Pub. Date: Mar. 9, 2023

(65) Prior Publication Data

US 2024/0383242 A1 Nov. 21, 2024

Related U.S. Application Data

(60) Provisional application No. 63/240,598, filed on Sep. 3, 2021.

(51) Int. Cl.
*B32B 27/08* (2006.01)
*B32B 27/30* (2006.01)
*B32B 27/36* (2006.01)

(52) U.S. Cl.
CPC ............ *B32B 27/08* (2013.01); *B32B 27/302* (2013.01); *B32B 27/36* (2013.01); *B32B 2250/03* (2013.01);

(Continued)

(58) Field of Classification Search
CPC ....... B32B 27/08; B32B 27/302; B32B 27/36; B32B 2250/03; B32B 2250/24;

(Continued)

(56) References Cited

U.S. PATENT DOCUMENTS 8,715,816 B2 * 5/2014 Schmidt .................. B29C 48/08 156/244.11
2002/0065345 A1 * 5/2002 Narita ........................ C08J 5/18 428/480

(Continued)

FOREIGN PATENT DOCUMENTS

CN 1723123 A 1/2006
CN 101460302 A 6/2009

(Continued)

OTHER PUBLICATIONS

International Search Report in PCT/IL2022/050910, dated Nov. 24, 2022.

(Continued)

*Primary Examiner* — Blaine Copenheaver
(74) *Attorney, Agent, or Firm* — AlphaPatent Associates Ltd.; Daniel J. Swirsky

(57) ABSTRACT

Provided is a multi-layered biodegradable sheet having at least three layers, wherein at least a first layer comprises thermoplastic starch (TPS) and at least one additional polymer; and at least a second layer comprises polybutylene succinate (PBSA) and/or poly butylene adipate terphthalate (PBAT).

6 Claims, 3 Drawing Sheets

(52) U.S. Cl.
CPC ....... *B32B 2250/24* (2013.01); *B32B 2270/00* (2013.01); *B32B 2307/31* (2013.01); *B32B 2307/7163* (2013.01); *B32B 2553/00* (2013.01)

(58) Field of Classification Search
CPC ............ B32B 2270/00; B32B 2307/31; B32B 2307/7163; B32B 2553/00; B32B 9/02; B32B 9/045; B32B 27/306; B32B 27/40; C08G 63/16; C08G 63/183; C08L 67/02; C08L 67/04; Y02W 90/10; B65D 65/466
See application file for complete search history.

(56) References Cited

U.S. PATENT DOCUMENTS

2007/0042207 A1* 2/2007 Berger ...................... C08J 5/18 428/480
2009/0179069 A1* 7/2009 Schmidt ................ B29C 48/307 229/87.08
2013/0071677 A1* 3/2013 Penttinen .............. B32B 27/308 427/407.1
2014/0050904 A1 2/2014 Lee
2015/0174867 A1* 6/2015 Neuman ................ B82Y 30/00 525/61
2015/0284133 A1* 10/2015 Nevalainen ............. B32B 27/36 206/557

FOREIGN PATENT DOCUMENTS

KR 102277340 B1 7/2021
WO 2011/158240 A1 12/2011
WO 2013/088443 A1 6/2013
WO 2013/186778 A1 12/2013
WO 2015/059709 A1 4/2015
WO 2016/067285 A1 5/2016
WO 2016/174665 A1 11/2016
WO 2016/207888 A1 12/2016
WO 2021/176067 A1 9/2021
WO 2022/173073 A1 8/2022

OTHER PUBLICATIONS

Written Opinion of the International Searching Authority in PCT/IL2022/050910, dated Nov. 30, 2022.
Machine Translation of KR 102277340 B1 Obtained from “Google Patents” on May 26, 2024 at: https://patents.google.com/patent/KR102277340B1/en.
Machine Translation of WO 2022/173073 A1 Obtained from “Google Patents” on May 26, 2024 at: https://patents.google.com/patent/WO2022173073A1/en.
Communication from the European Patent Office (EPO), in European patent application No. EP 22863787.2, including an Extended European Search Report (EESR) and four appendices, mailed out by the EPO on Jul. 24, 2025.
Machine Translation of CN 101460302 A, obtained on Jul. 25, 2025 from “Google Patents” from: https://patents.google.com/patent/CN101460302A/en.
Machine Translation of CN 1723123 A, obtained on Jul. 25, 2025 from “Google Patents” from: https://patents.google.com/patent/CN1723123A/en.

* cited by examiner

BIODEGRADABLE SHEETS

CROSS-REFERENCE TO RELATED APPLICATIONS

This patent application is a National Stage of PCT international application number PCT/IL2022/050910, having an international filing date of Aug. 21, 2022, which is hereby incorporated by reference in its entirety; which claims benefit and priority from U.S. 63/240,598, filed on Sep. 3, 2021, which is hereby incorporated by reference in its entirety.

FIELD OF THE INVENTION

The present invention, in at least some embodiments, is directed to biodegradable sheets, and in particular to multi-layered biodegradable sheets having at least three layers, wherein at least a first layer comprises a composition comprising thermoplastic starch (TPS) and at least one additional polymer; and at least a second layer comprises polybutylene succinate (PBSA) and/or polybutylene adipate terphthalate (PBAT).

BACKGROUND OF THE INVENTION

The use of biodegradable materials had increased over the past years due to the environmentally beneficial properties of such materials. Such materials are now commonly used in the manufacture of a wide range of products, including various types of plastic bags and other forms of packaging. In response to the demand for more environmentally friendly packaging materials, a number of new biopolymers have been developed that have been shown to biodegrade when discarded into the environment.

Examples of such polymers include biopolymers based on polylactic acid (PLA), polyhydroxyalkanoates (PHA), which include polyhydroxybutyrate (PHB), polyhydroxyvalerate (PHV) and polyhydroxybutyrate-hydroxyvalerate copolymer (PHBV), and poly (epsilon-caprolactone) (PCL).

Each of the foregoing biopolymers has unique properties, benefits and weaknesses. For example, PHB and PLA tend to be strong but are also quite rigid or even brittle. This makes them poor candidates when flexible sheets are desired, such as for use in making wraps, bags and other packaging materials requiring good bend and folding capability.

On the other hand, biopolymers, such as polybutylene adipate terphtalate (PBAT), are many times more flexible than the biopolymers discussed above and have relatively low melting points, so that they tend to be self-adhering and unstable when newly processed and/or exposed to heat. Further, due to the limited number of biodegradable polymers, it is often difficult, or even impossible, to identify a single polymer or copolymer that meets all, or even most, of the desired performance criteria for a given application. For these and other reasons, biodegradable polymers are not as widely used in the area of food packaging materials, particularly in the field of liquid receptacles, as desired for ecological reasons.

In addition, the biodegradable sheets known today are mostly opaque, having low light transmittance and high haze. Further, the known biodegradable sheets either do not include barrier layers or include amounts and types of barrier layers that cause the sheets to be generally highly permeable to gases, having both a high oxygen transmission rate and a high water vapor transmission rate, and thus they cannot serve as long term food or drink receptacles. Additionally, the physical strength of known biodegradable sheets, measured by parameters, such as stress at maximum load, strain at break, and Young's Modulus, is lacking and, therefore, is deficient when used as packaging, particularly when it is desirable to package liquids. Moreover, the high cost when using certain biopolymers is a further disadvantage.

Background art includes PCT Publication Nos. WO 2011/158240, WO 2013/088443, WO 2013/186778, WO 2015/059709, WO 2016/067285, WO 2016/174665 and WO 2016/207888 to the present applicant.

There remains a need for biodegradable sheets for packaging, which are devoid of at least some of the disadvantages of the prior art.

SUMMARY OF THE INVENTION

The present inventors have surprisingly found that a multi-layered biodegradable sheet having at least one layer comprising a composition comprising thermoplastic starch (TPS) and at least one additional polymer; and at least one additional layer comprising polybutylene succinate (PBSA) and/or polybutylene adipate terphthalate (PBAT) provides an alternative to known biodegradable sheets, having substantially the same physical, mechanical and optical properties, at a significantly lower cost.

According to an aspect of some embodiments of the present invention, there is provided a multi-layered biodegradable sheet having at least a first layer comprising a composition comprising TPS and at least one additional polymer; and at least a second layer comprising PBSA and/or PBAT.

According to some embodiments, the at least one additional polymer is selected from the group consisting of cellulose, polyvinyl alcohol, a polyester, polyurethane and mixtures thereof. According to an embodiment, the polyester is selected from the group consisting of PBAT. PBS, PBSA, PCL, PLA, PHA, PGA and combinations thereof. According to some embodiments, the second polymer comprises PBAT.

According to some embodiments, the second polymer is present at a concentration of from about 20 wt % to about 70 wt % of the total composition, such as about 20 wt %, about 30 wt %, about 40 wt % about 50 wt %, about 60 wt % or about 70 wt %. According to some embodiments, the second polymer is present at a concentration of from about 30 wt % to about 60 wt % or from about 40 wt % to about 50 wt % of the total composition. According to some embodiments, said second layer comprises PBSA.

According to some embodiments, said second layer is an outer layer, the sheet further comprising a third layer which is an outer layer, wherein said first layer is a core layer located between said second layer and said third layer. According to some such embodiments, said second layer is an outer layer and said third layer is a sealing layer. According to some such embodiments, said second layer is a sealing layer and said third layer is a contact layer. According to some embodiments, said second layer comprises PBSA. According to some such embodiments, said second layer comprises about 100 wt % PBSA.

According to some embodiments, said second layer further comprises PLA.

According to some embodiments, said second layer comprises from about 70 wt % to about 90 wt % PBSA (such as about 70 wt %, about 75 wt %, about 80 wt %, about 85 wt % or about 90 wt % PBSA) and from about 10 wt % to about 30 wt % PLA (such as about 10 wt %, about 15 wt %, about 20 wt %, about 25 wt % or about 30 wt % PLA).

According to some embodiments, said second layer comprises about 75 wt % PBSA and about 25 wt % PLA.

According to some embodiments, said second layer comprises about 85 wt % PBSA and about 15 wt % PLA.

According to some embodiments, said third layer comprises PBSA. According to some such embodiments, said second layer comprises about 100 wt % PBSA. According to some embodiments, said third layer further comprises PLA. According to some embodiments, said third layer comprises from about 70 wt % to about 90 wt % PBSA (such as about 70 wt %, about 75 wt %, about 80 wt %, about 85 wt % or about 90 wt % PBSA) and from about 10 wt % to about 30 wt % PLA (such as about 10 wt %, about 15 wt %, about 20 wt %, about 25 wt % or about 30 wt % PLA).

According to some embodiments, said third layer comprises about 75 wt % PBSA and about 25 wt % PLA.

According to some embodiments, said third layer comprises about 85 wt % PBSA and about 15 wt % PLA.

According to some embodiments, said third layer comprises TPS and at least one additional polymer. According to some such embodiments, the at least one additional polymer is selected from the group consisting of cellulose, polyvinyl alcohol, a polyester, polyurethane and mixtures thereof. According to an embodiment, the polyester is selected from the group consisting of PBAT, PBS, PBSA. PCL, PLA, PHA, PGA and combinations thereof.

According to some embodiments, the second polymer comprises PBAT.

According to some embodiments, the second polymer is present at a concentration of from about 20 wt % to about 70 wt % of the total composition, such as about 20 wt %, about 30 wt %, about 40 wt %, about 50 wt %, about 60 wt % or about 70 wt %. According to some embodiments, the second polymer is present at a concentration of from about 30 wt % to about 60 wt % or from about 40 wt % to about 50 wt % of the total composition.

According to some such embodiments, each of said second layer and said third layer comprises PBSA.

According to some such embodiments each of said second layer and said third layer comprises about 100 wt % PBSA.

According to some embodiments, each of said second layer and said third layer comprises about 85 wt % PBSA and about 15 wt % PLA.

According to some embodiments, said second layer comprises TPS and at least one additional polymer; and said third layer comprises about 85 wt % PBSA and about 15 wt % PLA.

According to some embodiments, said third layer comprises PBAT. According to some embodiments, said third layer comprises about 100 wt % PBAT. According to some such embodiments, said second layer comprises about 100 wt % PBSA. According to some such embodiments, a wt % ratio of said PBAT: said composition comprising TPS and said additional polymer: said PBSA is about from about 5 to about 20 wt % (such as about 5, about 10, about 15 or about 20 wt %) PBAT: from about 60 to about 80 wt % (such as about 60, about 65, about 70, about 75 or about 80 wt %) TPA: from about 10 to about 30 wt % (such as about 10, about 15, about 20, about 25 or about 30 wt %) PBSA. According to one such embodiment, a wt % ratio of said PBAT: said composition comprising TPS and said additional polymer: said PBSA is about 10:70:20.

According to some embodiments, said first layer is an outer layer, the multi-layered biodegradable sheet further comprising a third layer which is an outer layer, wherein said second layer is a core layer located between said first layer and said third layer. According to some layers, the multi-layered biodegradable sheet further comprises, two, four, six or more additional layers, such that the sheet comprises a total number of three, five, seven or more layers.

According to some embodiments, the additional layers are outer layers such that the first second and third layers as disclosed herein are situated between said outer layers.

According to some embodiments, the additional layers are intermediate layers, between two outer layers as disclosed herein. Hence, in some such embodiments, said first layer comprising a composition comprising TPS and an additional polymer is a core layer, said second layer and said third layers are outer layers, wherein at least a first additional layer is situated between said core layer and said second layer and at least a second additional layer is situated between said core layer and said third layer. Alternatively, in some such embodiments, said first layer comprising a composition comprising TPS and an additional polymer is an outer layer, said second layer is an outer layer and said third layer is a core layer, wherein at least a first additional layer is situated between said core layer and said second layer and at least a second additional layer is situated between said core layer and said third layer.

BRIEF DESCRIPTION OF THE FIGURES

Some embodiments of the invention are described herein with reference to the accompanying figures. The description, together with the figures, makes apparent to a person having ordinary skill in the art how some embodiments of the invention may be practiced. The figures are for the purpose of illustrative discussion and no attempt is made to show structural details of an embodiment in more detail than is necessary for a fundamental understanding of the invention. For the sake of clarity, some objects depicted in the figures are not to scale.

In the Figures.

DETAILED DESCRIPTION OF THE INVENTION

Definitions

Figure 1:
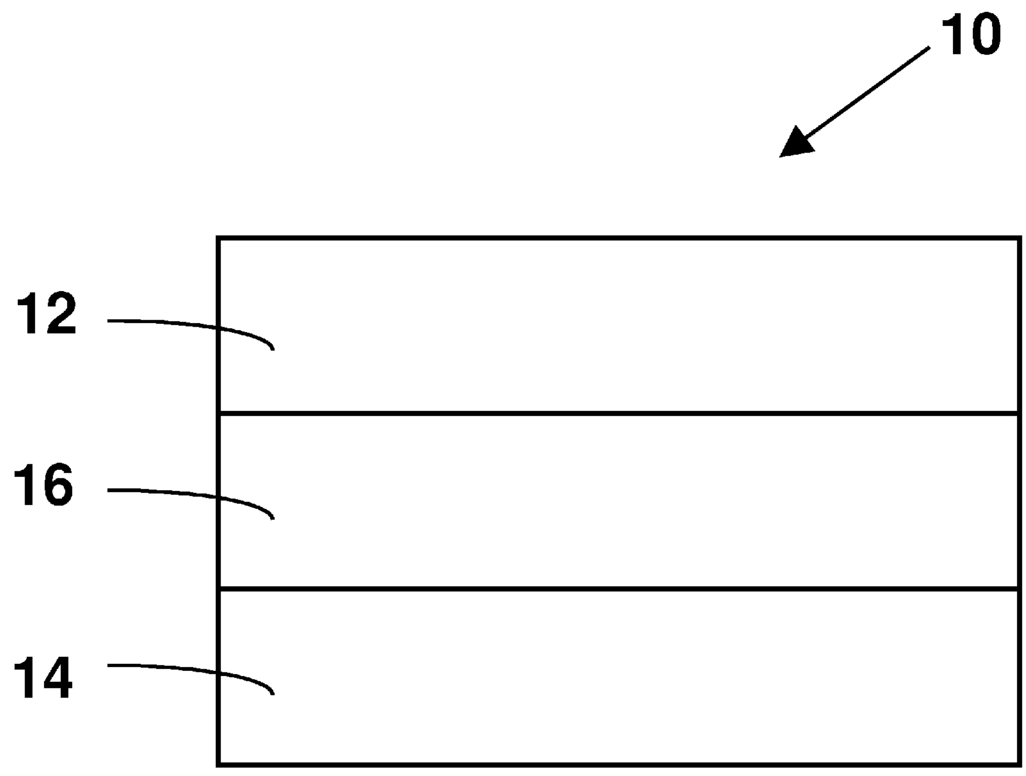
FIG. 1 is a schematic representation of a three-layered sheet in accordance with the principles of the present invention.

Unless otherwise defined, all technical and scientific terms used herein have the same meaning as commonly understood by one of ordinary skill in the art to which the invention pertains. In case of conflict, the specification, including definitions, takes precedence.

The term "biodegradable" as used herein is to be understood to include a polymer, polymer mixture, or polymer-containing sheet that degrades through the action of living organisms in air, water or any combinations thereof within 1 year. Biodegradable polyester degradation is initially by hydrolysis, to eventually break the polymer into short oligomers, and later by microbial degradation, or microbial digestion. Biodegradable material may break down under a variety of conditions, for example under aerobic or anaerobic conditions, in compost, in soil or in water (such as sea, rivers or other waterways).

Material which may be degraded in compost is referred to as compostable. Hence, as used herein, the term "compostable" refers to a polymer, polymer mixture, or polymer-containing sheet which is degraded by biological processes under aerobic conditions to yield carbon dioxide, water, inorganic compounds and biomass and leaves no visible, distinguishable or toxic residues. Composting of such materials may require a commercial composting facility or the material may be home compostable.

As used herein, the term "home compostable" refers to a polymer, polymer mixture, or polymer-containing sheet which is compostable in a home composting container, i.e. at significantly lower temperatures and in the absence of set conditions as compared to those provided in a commercial composting facility. Home composting is usually carried out in significantly smaller volumes than those used for commercial composting, and do not include an industrial shredding process.

The term "sheet" as used herein is to be understood as having its customary meanings as used in the thermoplastic and packaging arts and includes the term "film". Such sheets may have any suitable thickness, may be of a single polymer layer or of multiple polymer layers. Such sheets may be manufactured using any suitable method including blown film extrusion and cast film extrusion.

As used herein, the term "thermoplastic starch" (TPS) refers to a compound based on starch that has been plasticized (destructurized) by relatively low levels of molecules that are capable of hydrogen bonding with the starch hydroxyl groups, such as water, glycerol and sorbitol. This "thermoplastic starch" (TPS) will flow at elevated temperatures and pressures and become applicable for extrusion processes, in contrast to native starch, which is a semi-crystalline polymer that cannot be processed thermo-plastically in conventional polymer processing techniques.

However, the properties of these simple thermoplastic compounds tend to be relatively inferior. The present inventors have surprisingly found that various properties of TPS, such as processability, melt strength, melt rheology, chemical compatibility, improved mechanical strength can be improved significantly by blending with other polymers, including cellulose, polyvinyl alcohol, polyesters (such as PBAT, PBS, PBSA, PCL, etc.) and polyurethanes. As used herein, the term "core layer" of a biodegradable sheet having an odd number of layers refers to the innermost layer of the sheet, such that an equal number of layers (an outer layer and at least one inner layer) is positioned on each said of the core layer.

As used herein, the term "outer layer" of a biodegradable sheet refers to a layer having no additional layer on one side thereof, such that in an unwound such sheet, the outer layer is exposed to the environment.

As used herein, the term "contact layer" of a biodegradable sheet refers to a layer which, when the sheet is used to form a wrapping or package, constitutes the inner surface of the wrapping or package, such that the contact layer may contact material or items contained within the wrapping or package.

As used herein, the term "sealing layer" of a biodegradable sheet refers to a layer which, when the sheet is used to form a wrapping or package, is the layer furthest from the contact layer, and is intended to include a sealing layer to which a coating is optionally applied.

As used herein, reference to a specified percentage (w/w) of a polymer layer is intended to refer to the percentage of the specified polymer in a polymer mixture from which the polymer layer is formed. The layer may further comprise a minor amount (no greater than about 5% (w/w) of the total composition of the layer) additives such as slip, anti-block, anti-oxidant and the like.

It is to be noted that, as used herein, the singular forms "a", "an" and "the" include plural forms unless the content clearly dictates otherwise. Where aspects or embodiments are described in terms of Markush groups or other grouping of alternatives, those skilled in the art will recognize that the invention is also thereby described in terms of any individual member or subgroup of members of the group.

As used herein, when a numerical value is preceded by the term "about", the term "about" is intended to indicate +/−10%.

As used herein, the terms "comprising", "including", "having" and grammatical variants thereof are to be taken as specifying the stated features, integers, steps or components but do not preclude the addition of one or more additional features, integers, steps, components or groups thereof. These terms encompass the terms "consisting of" and "consisting essentially of".

In some embodiments, the biodegradable sheet as disclosed herein is used to prepare a biodegradable package, such as a bag or pouch, for example for containing therein an ingestible substance such as a food, drink or medicine, which may be a solid, semi-solid or liquid substance; or for containing therein a non-ingestible substance such as an item of clothing, a toiletry or cosmetic material or the like. For example, in some embodiments, the biodegradable package is prepared by heat sealing of two or more parts of the same sheet or two or more separate sheets.

As known to a person having ordinary skill in the art, some of the polymers discussed herein have one or more names or spelling thereof. For example, poly(caprolactone) and polycaprolactone are synonymous and the terms are used interchangeably. Similarly, polylactic acid and poly (lactic acid) are synonymous.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Many modifications and variations are possible in light of the above teachings. It is, therefore, to be understood that within the scope of the appended claims, the invention can be practiced otherwise than as specifically described.

The specific embodiments listed below exemplify aspects of the teachings herein and are not to be construed as limiting.

Citation of any document herein is not intended as an admission that such document is pertinent prior art or considered material to the patentability of any claim of the present disclosure. Any statement as to content or a date of any document is based on the information available to applicant at the time of filing and does not constitute an admission as to the correctness of such a statement.

Referring now to FIG. 1, there is shown a schematic representation of three-layered sheet 10, comprising a first outer layer 12, a second outer layer 14 and an inner (core layer) 16, wherein core layer 16 is positioned between first outer layer 12 and second outer layer 14.

EXAMPLES

In the experimental section below, all percentages are weight percentages.

Materials and Methods

All the embodiments of polymer sheets according to the teachings herein are made using commercially-available raw materials and devices, using one or more standard methods including: polymer resin drying, resin mixing, cast film extrusion, cast film co-extrusion, blown film extrusion and coextrusion and adhesive lamination.

Materials

The following polymer resins trials were acquired from commercial sources:

TPS thermoplastic starch blended with at least one additional polymer (referred to hereinafter as "TPS blend")
PBSA poly (butylene succinate adipate)
PLA polylactic acid
PBAT poly (butylene adipate terephthalate)

The resins may be used as supplied, without further drying. Optionally, before use, resins are further dried, such as by drying overnight in an air flow Shini SCD-160U-120H desiccant dryer heated to about 80° C.

The polymer sheets according to the teachings herein include layers comprising a polymer mixture. Such layers are made by coextrusion of a polymer mixture resin.

To make the required polymer mixture resins, the appropriate amounts of the dried constituent resins are dry-blended and then introduced into the feed zone of the extruders and co-extruded as a film.

Cast Film Coextrusion of Sheets

Some embodiments of sheets according to the teachings herein are made by coextrusion of three or more layers to make a desired sheet by multilayer cast film co extrusion.

Some embodiments of sheets according to the teachings herein are made by lamination of single and multilayer cast film extruded films. Films and sheets are made using a cast film coextruder Dr. Collin (Collin Lab and Pilot Solutions) using standard settings, typically the mixture is fed into the extruder with the temperature zone settings 195° C.; Adaptor at about 200° C.; feedblock at about 200° C.; Die at 210° C. The screw speed is set to provide an extruded layer having the desired thickness in the usual way. For multilayer films, a die having three ports, each fed by a dedicated extruder is used.

Example 1: Specific Embodiments of Three-Layered Sheets According to the Teachings Disclosed Herein Exemplary sheets #1-4, representing specific embodiments according to the teachings disclosed herein are prepared, according to Table 1. The total thickness of each sheet is 40 μm.

TABLE 1

| # | Second layer | First layer | Third layer |
|---|---|---|---|
| 1 | 100% PBSA | 100% TPS blend | 100% PBSA |
| 2 | 100% PBSA | 100% TPS blend | 100% TPS |
| 3 | 85% PBSA:15% PLA | 100% TPS blend | 85% PBSA:15% PLA |
| 4 | 85% PBSA:15% PLA | 100% TPS blend | 100% TPS blend |
| 5 | 85% PBSA:15% PLA | 100% TPS blend | 100% PBSA |
| 6 | 85% PBSA:15% PLA | 100% TPS blend | 100% PBAT |
| 7 | 100% PBAT | 100% TPS blend | 100% PBSA |
| 8 | 100% PBAT | 100% TPS blend | 100% TPS blend |

The sheets were prepared as follows, each layer was extruded from a dedicated extruder, such that, for example, three extruders were used for preparing a three-layered sheet.

Sheet #1 made by Cast Film Coextrusion of
100% PBSA
100% TPS blend
100% PBSA

Sheet #2 made by Cast Film Coextrusion of
100% PBSA
100% TPS blend
100% TPS blend Sheet #3 made by Cast Film Coextrusion of
85% PBSA: 15% PLA
100% TPS blend
85% PBSA: 15% PLA Sheet #4 made by Cast Film Coextrusion of
85% PBSA: 15% PLA
100% TPS blend
100% TPS blend Sheet #5 made by Cast Film Coextrusion of
85% PBSA: 15% PLA
100% TPS blend
100% PBSA Sheet #6 made by Cast Film Coextrusion of
85% PBSA: 15% PLA
100% TPS blend
100% PBAT Sheet #7 made by Cast Film Coextrusion of
100% PBSA
100% TPS blend
100% PBAT Sheet #8 made by Cast Film Coextrusion of
100% PBAT
100% TPS blend
100% TPS blend

Example 2: Properties of an Exemplary Film

A test sheet corresponding to sheet #6 of Table 1 was prepared as disclosed above, having a total sheet thickness of 40 μm, wherein a thickness ratio of third layer:first layer:second layer is 10:70:20.

A monolayer comprising 100% TPS blend, having a thickness of 40 μm, was prepared as a control sheet.

In order to define the physical properties of the biodegradable sheets disclosed herein, the following test methods were used:

a. Heat sealing was measured using the ASTM F2029/F88 Standard Test Method for Seal Strength of Flexible Barrier Materials in machine direction. For testing, three strips, each of width 25.4 mm, were provided for each of the test and control samples, and presealed inside in for each seal temperature. The strips had a length of 100 mm after sealing.
b. Haze and light transmittance were measured using the ASTM D1003 Standard Test Method for Haze and Luminous Transmittance of Transparent Plastics. For testing, two strips, each of dimensions 10 cm×10 cm were provided for each of the test and control samples.

Results

Figure 2:
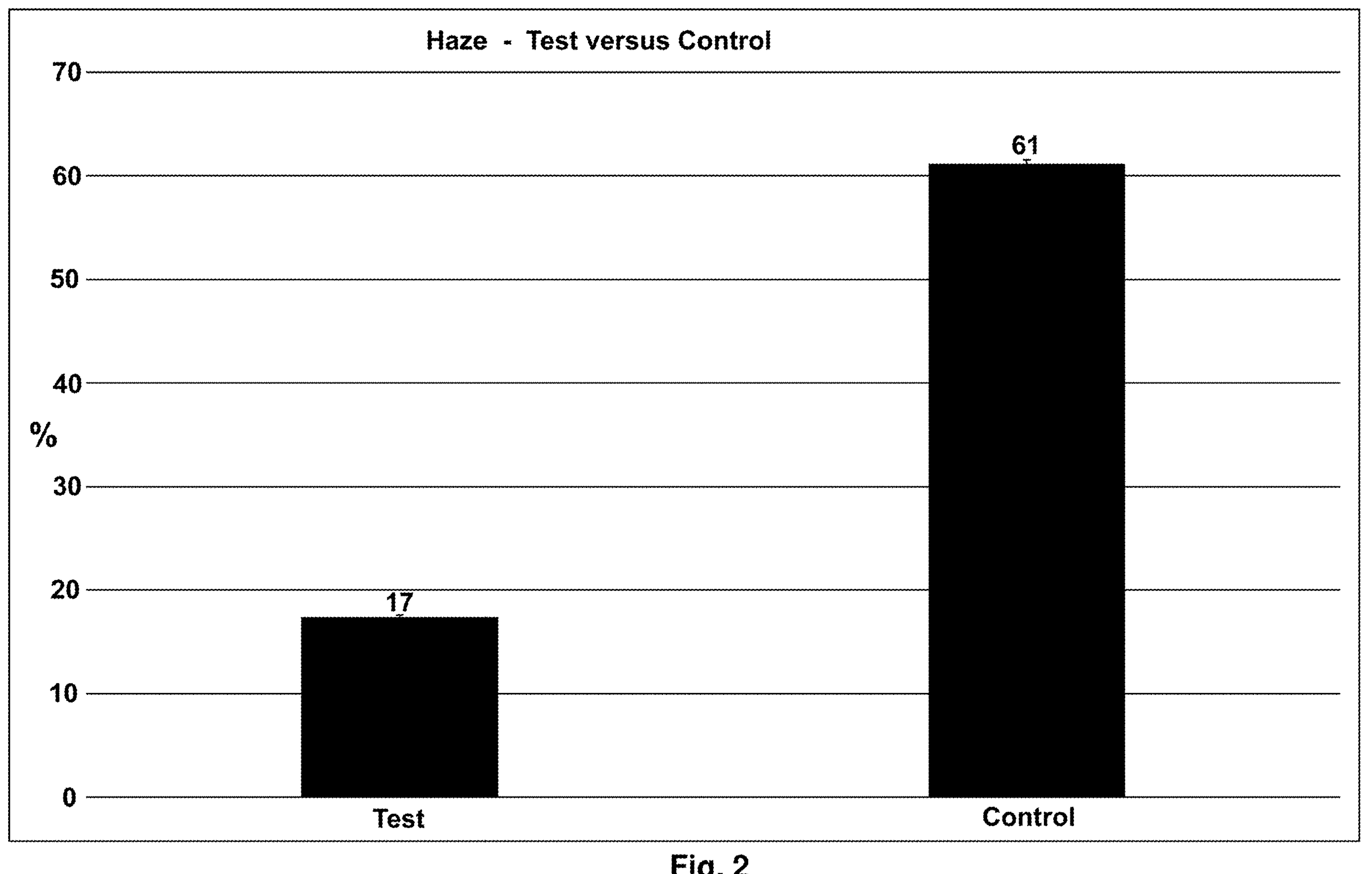
FIG. 2 is a bar graph presenting optical haze properties of a three-layered test sheet in according with the principles of the present invention as compared to a monolayer control sheet.
Figure 3:
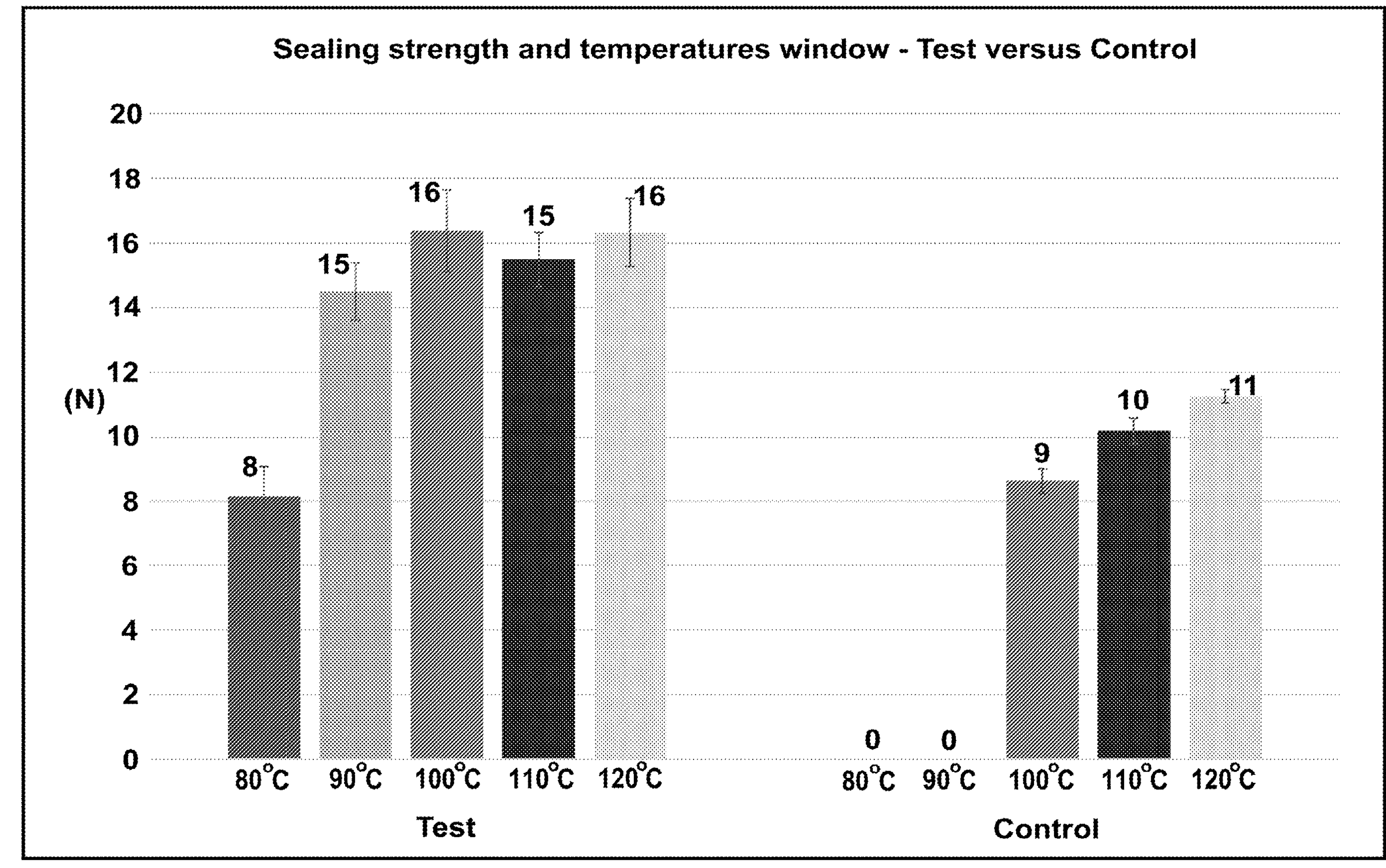
FIG. 3 is a bar graph presenting sealing properties of the test and control sheets of FIG. 2.

Results are presented in FIGS. 2 and 3, showing the advantages of the test sheet as compared to the control sheet.

FIG. 2 presents the haze values, wherein a lower percentage haze indicates greater transparency. As can be seen from the figure, the clarity of the test film is 260% greater than that of the control sheet, while the haze value is decreased from 61% for the control sheet to 17% for the test sheet.

FIG. 3 presents the sealing strength and temperature window of the test sheet. As can be seen from the figure, the sealing strength in the sealing window of the control sheet (100-120° C.) is increased by about 50-70% (from 9-11 N to 15-16 N) when used as a layer of the multi-layered test sheet. The sealing window is expanded by about 20° C. for the test sheet as compared to the control sheet (from 100-120° C. to 80-120° C.). It is therefore shown that a multi-layered sheet comprising TPS blend in accordance with the principles of the present invention has significantly improved clarity, sealing strength and sealing window as compared to a monolayer comprising the TPS blend.

The inventions illustratively described herein may suitably be practiced in the absence of any element or elements, limitation or limitations, not specifically disclosed herein. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise indicated.

Although the above examples have illustrated particular ways of carrying out embodiments of the invention, in practice persons skilled in the art will appreciate alternative ways of carrying out embodiments of the invention, which are not shown explicitly herein. It should be understood that the present disclosure is to be considered as an exemplification of the principles of this invention and is not intended to limit the invention to the embodiments illustrated. Those skilled in the art will recognize or be able to ascertain using no more than routine experimentation, equivalents of the specific embodiments of the invention described herein. Such equivalents are intended to be encompassed by the following claims.

The invention claimed is:

1. A multi-layered biodegradable sheet having at least a first layer comprising a composition comprising thermoplastic starch (TPS) and polybutylene adipate terephthalate (PBAT); a second layer comprising polybutylene succinate adipate (PBSA) and polylactic acid (PLA); and a third layer consisting of 100 wt % PBAT, wherein said second layer is an outer layer, wherein said third layer is an outer layer, and wherein said first layer is a core layer located between said second layer and said third layer.

2. The multi-layered biodegradable sheet according to claim 1, wherein said second layer comprises from about 70 wt % to about 90 wt % PBSA and from about 10 wt % to about 30 wt % PLA.

3. The multi-layered biodegradable sheet according to claim 2, wherein said second layer comprises about 85 wt % PBSA and about 15 wt % PLA.

4. The multi-layered biodegradable sheet according to claim 1, produced by a method selected from the group consisting of blown film extrusion and cast film extrusion.

5. A biodegradable package comprising the biodegradable sheet of claim 1.

6. The biodegradable package of claim 5 in the form of a bag or pouch.

* * * * *